United States Patent
Benoit

(10) Patent No.: US 10,327,421 B2
(45) Date of Patent: Jun. 25, 2019

(54) FECES COLLECTION DEVICE

(71) Applicant: Livingston Benoit, Miami, FL (US)

(72) Inventor: Livingston Benoit, Miami, FL (US)

( * ) Notice: Subject to any disclaimer, the term of this patent is extended or adjusted under 35 U.S.C. 154(b) by 88 days.

(21) Appl. No.: 15/596,848

(22) Filed: May 16, 2017

(65) Prior Publication Data

US 2018/0332824 A1 Nov. 22, 2018

(51) Int. Cl.
| | |
|---|---|
| A01K 23/00 | (2006.01) |
| A47L 5/24 | (2006.01) |
| A47L 9/28 | (2006.01) |
| A47L 9/32 | (2006.01) |
| A47L 9/14 | (2006.01) |
| A47L 7/00 | (2006.01) |

(52) U.S. Cl.
CPC .............. *A01K 23/005* (2013.01); *A47L 5/24* (2013.01); *A47L 7/0085* (2013.01); *A47L 9/1481* (2013.01); *A47L 9/2857* (2013.01); *A47L 9/2884* (2013.01); *A47L 9/322* (2013.01)

(58) Field of Classification Search
CPC ....... A01K 23/005; A47L 5/24; A47L 7/0085; A47L 9/1481; A47L 9/2857; A47L 9/2884; A47L 9/322
See application file for complete search history.

(56) References Cited

U.S. PATENT DOCUMENTS

| | | | |
|---|---|---|---|
| 4,185,355 A | 1/1980 | Williams | |
| 4,449,319 A * | 5/1984 | Garcia | A01M 3/005 43/139 |
| 4,745,654 A * | 5/1988 | Yamamoto | A47L 5/24 15/344 |
| 5,771,531 A | 6/1998 | Swartz | |
| 6,115,879 A * | 9/2000 | Mitchell | A47L 5/36 15/327.5 |
| 6,618,898 B2 | 9/2003 | Tingle | |
| 7,003,846 B2 | 2/2006 | Holtz | |
| 7,404,230 B1 | 7/2008 | Phillips | |
| 7,404,269 B2 * | 7/2008 | Collins | A01M 1/06 43/139 |
| 7,703,170 B2 | 4/2010 | Orubor | |
| 7,984,530 B2 | 7/2011 | Reynolds et al. | |
| D664,726 S | 7/2012 | McCarthy et al. | |
| 2005/0246944 A1 * | 11/2005 | Flowers | A01M 3/005 43/139 |
| 2008/0030032 A1 | 2/2008 | Gill | |
| 2008/0148511 A1 * | 6/2008 | Brown | A47L 5/24 15/339 |

FOREIGN PATENT DOCUMENTS

WO WO1998022013 5/1998

* cited by examiner

Primary Examiner — Dung Van Nguyen

(57) ABSTRACT

A feces collection device for sanitary collection and disposal of fecal matter includes a housing that defines an internal space. An orifice is positioned in a front of the housing. A first grate is positioned in the housing proximate to a back of the housing. A power module and a motor are coupled to the housing and positioned in the internal space. The motor is selectively operationally couplable to the power module. A fan is coupled to the motor and is positioned in the internal space. The motor is positioned to rotate the fan. The fan is configured to pull air and the fecal matter through the orifice into the internal space. The fecal matter is retained in the internal space as the air exits the internal space through the first grate.

14 Claims, 5 Drawing Sheets

FECES COLLECTION DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98.

The disclosure and prior art relates to collection devices and more particularly pertains to a new collection device for sanitary collection and disposal of fecal matter.

BRIEF SUMMARY OF THE INVENTION

An embodiment of the disclosure meets the needs presented above by generally comprising a housing that defines an internal space. An orifice is positioned in a front of the housing. A first grate is positioned in the housing proximate to a back of the housing. A power module and a motor are coupled to the housing and positioned in the internal space. The motor is selectively operationally couplable to the power module. A fan is coupled to the motor and is positioned in the internal space. The motor is positioned to rotate the fan. The fan is configured to pull air and fecal matter through the orifice into the internal space. The fecal matter is retained in the internal space as the air exits the internal space through the first grate.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
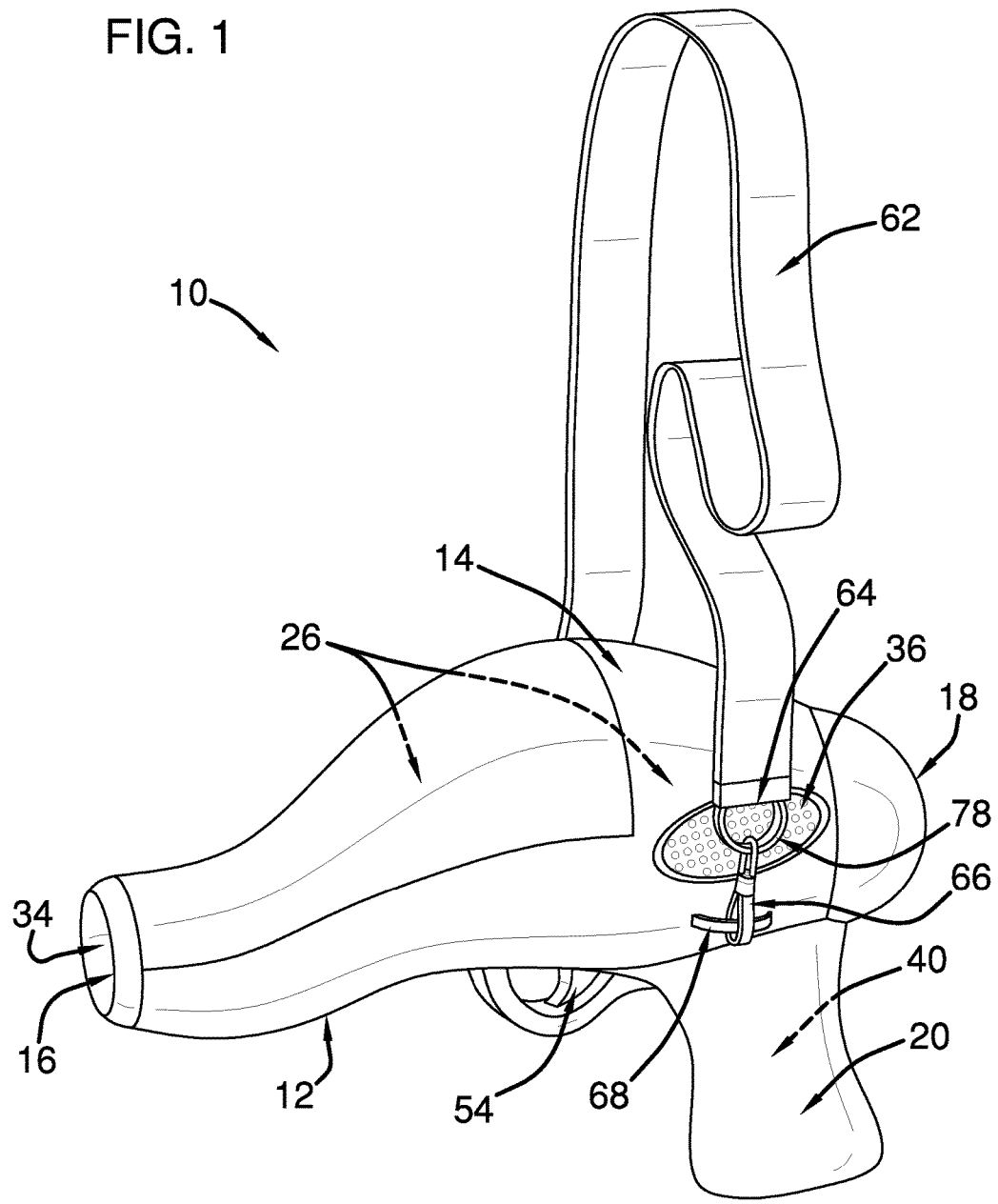
FIG. 1 is an isometric perspective view of a feces collection device according to an embodiment of the disclosure.
Figure 2:
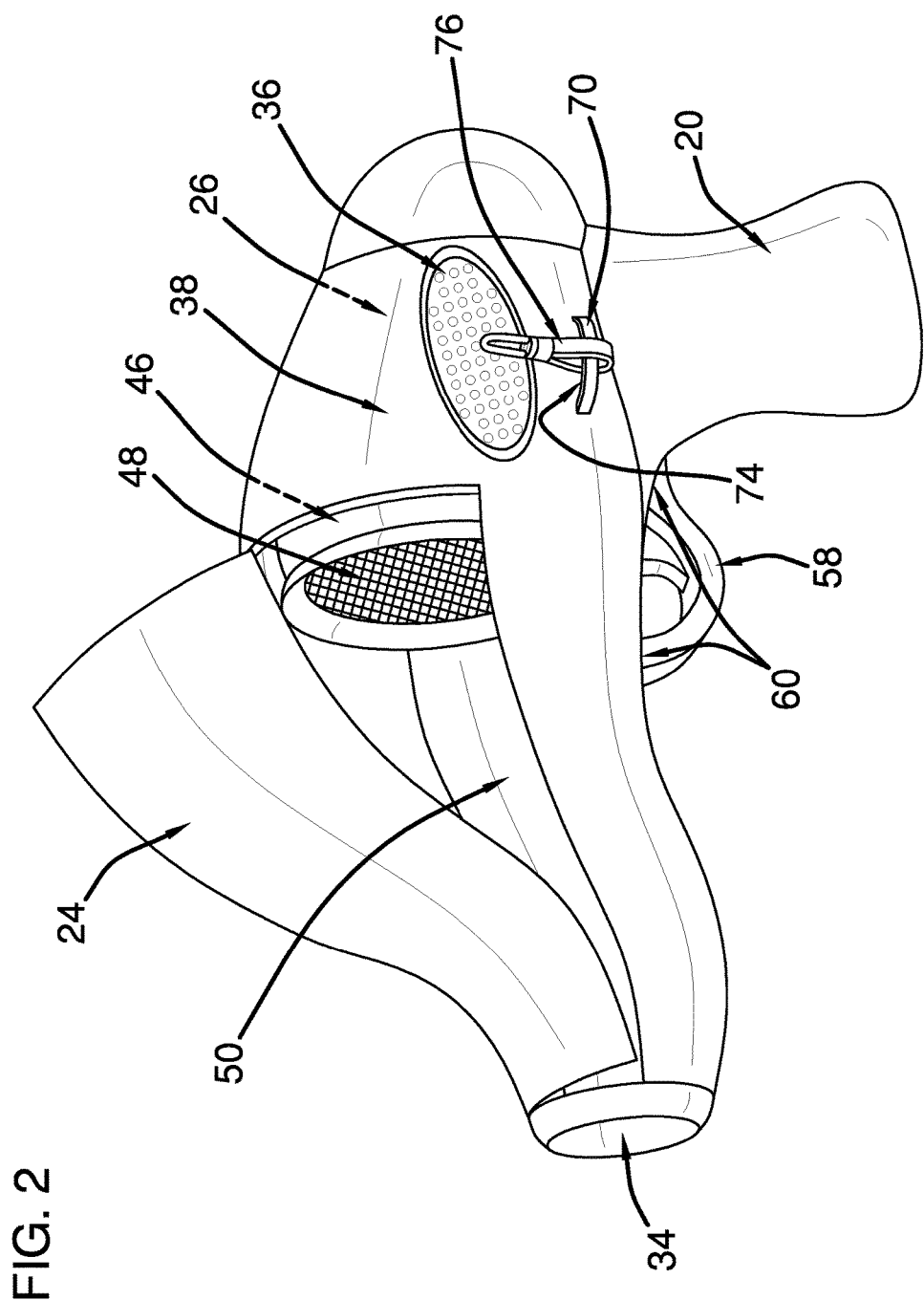
FIG. 2 is an isometric perspective view of an embodiment of the disclosure.
Figure 3:
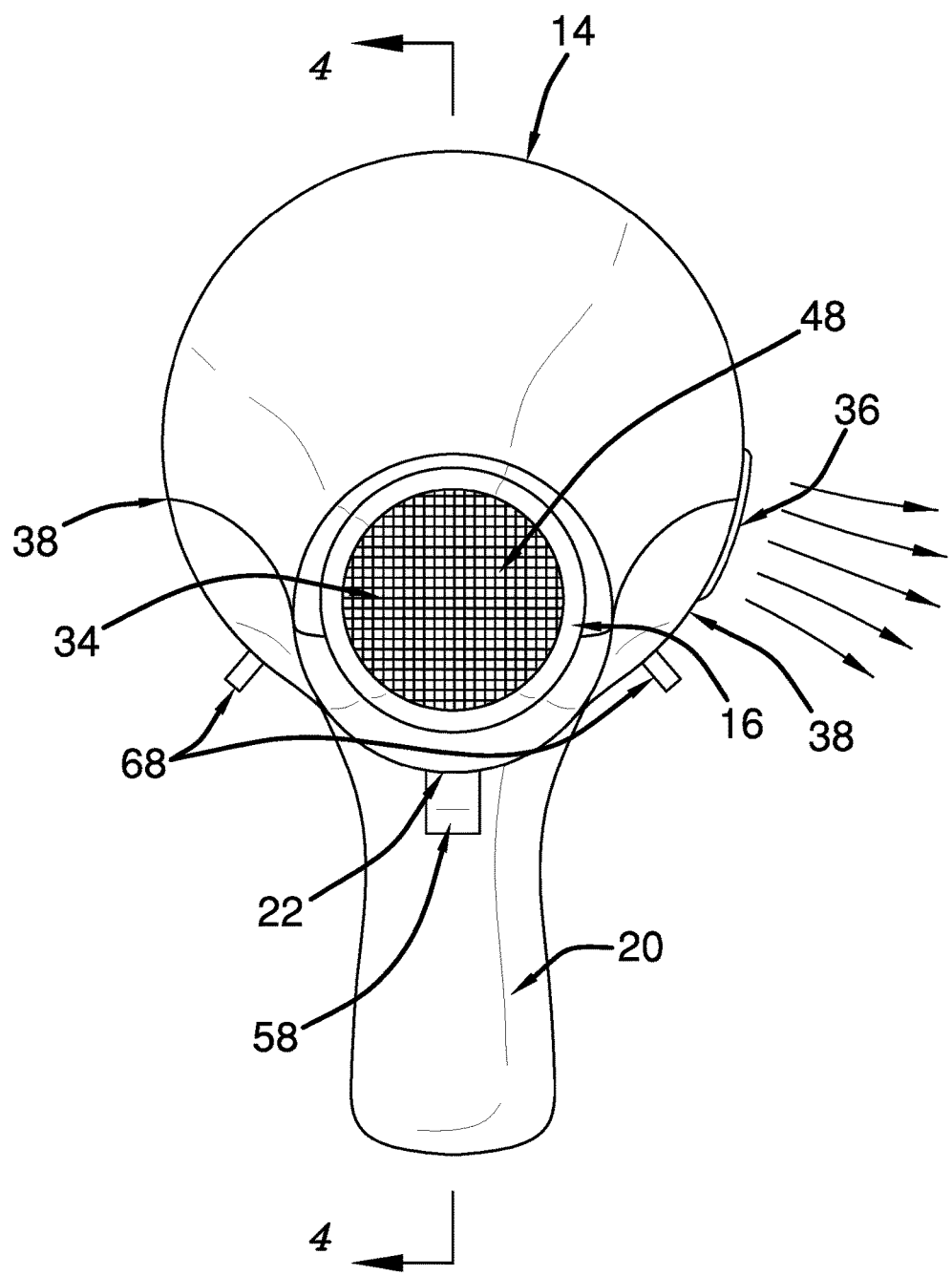
FIG. 3 is a front view of an embodiment of the disclosure.
Figure 4:
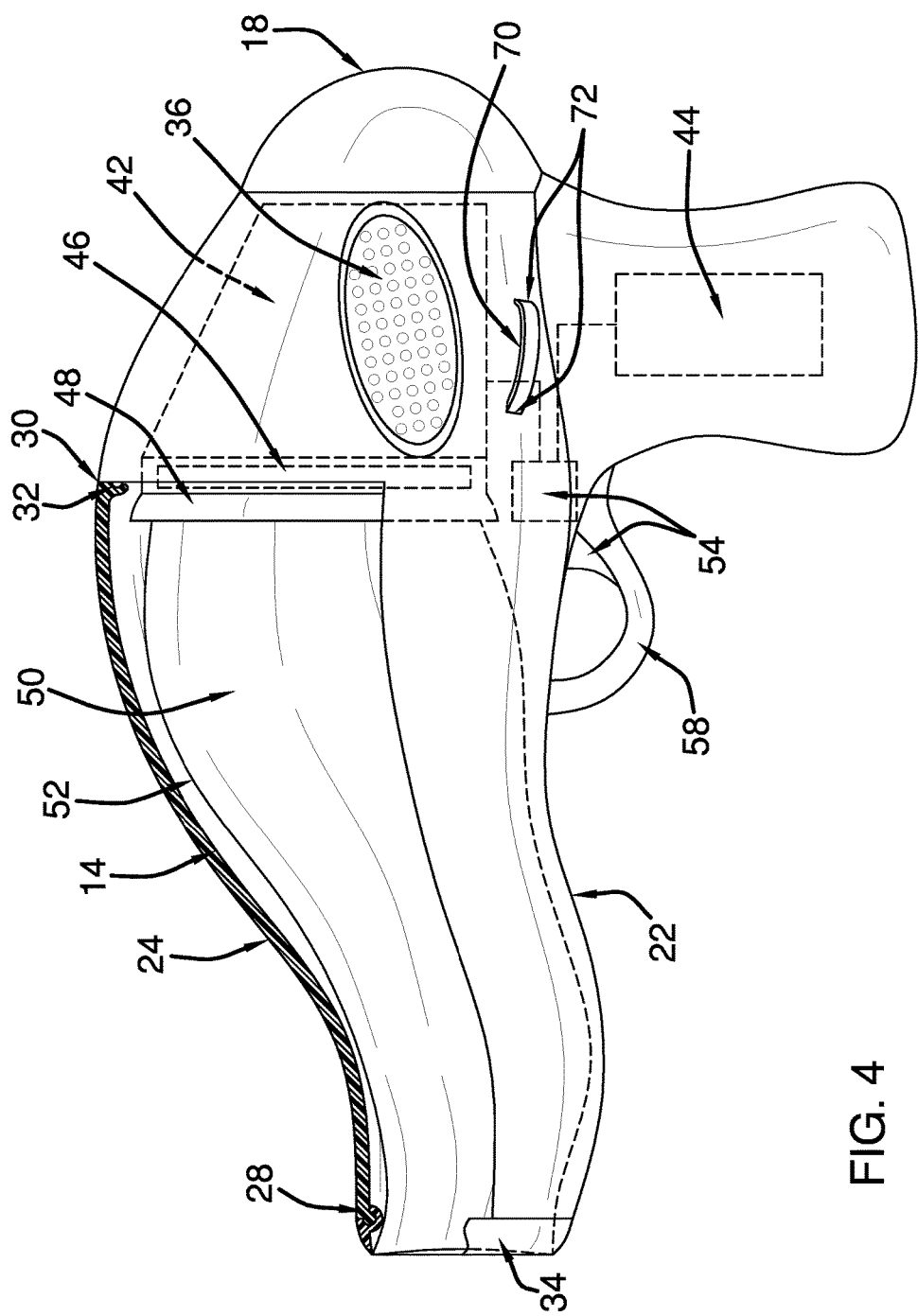
FIG. 4 is a cross-sectional view of an embodiment of the disclosure.
Figure 5:
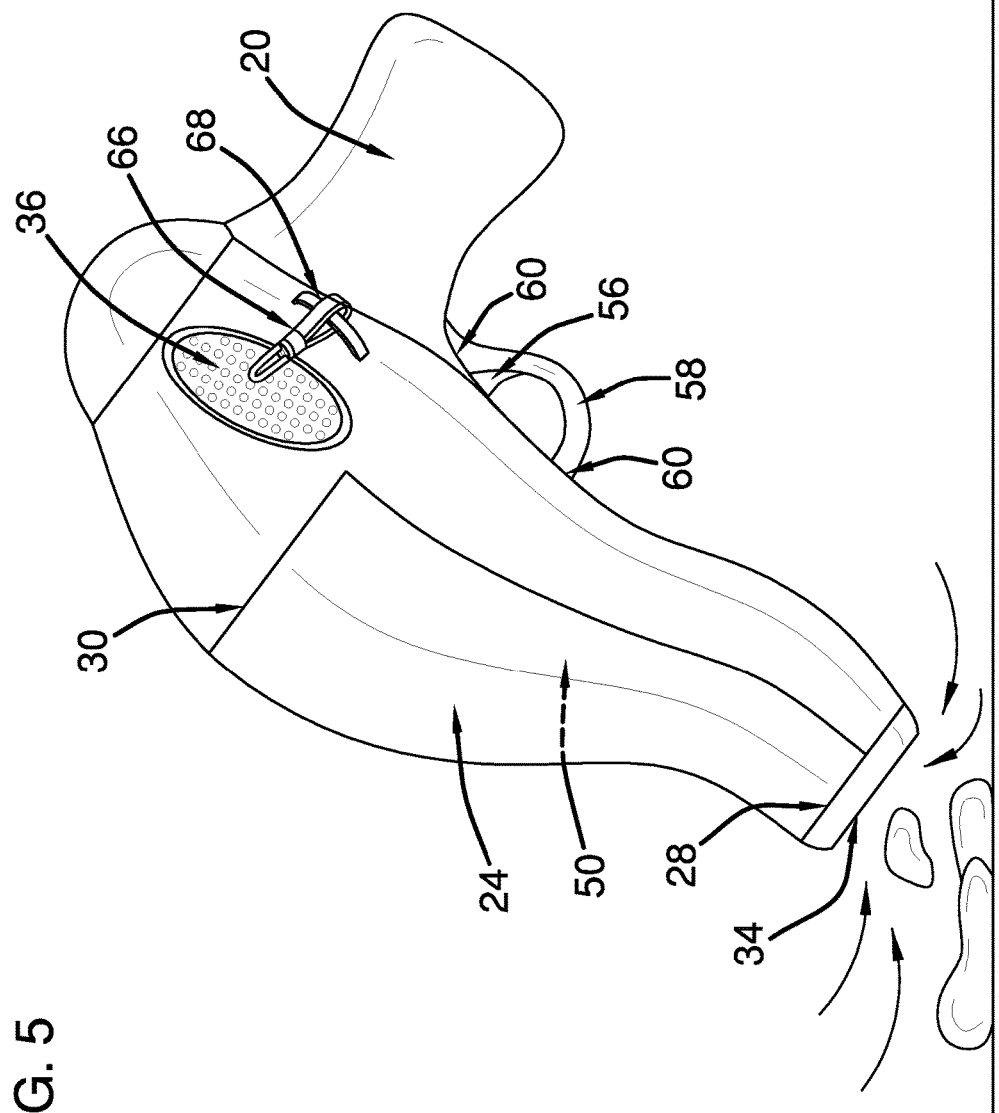
FIG. 5 is an in-use view of an embodiment of the disclosure.

With reference now to the drawings, and in particular to FIGS. 1 through 5 thereof, a new collection device embodying the principles and concepts of an embodiment of the disclosure and generally designated by the reference numeral 10 will be described.

As best illustrated in FIGS. 1 through 5, the feces collection device 10 generally comprises a housing 12 that defines an internal space 26. In one embodiment, the housing 12 is substantially cylindrically shaped. The housing 12 has a top 14, a front 16, and a back 18. In another embodiment, the back 18 is convexly arcuate so that the back 18 is rounded. In yet another embodiment, the top 14 is arcuate and tapered proximate to the front 16.

The housing 12 comprises a handle 20 that extends from a bottom 22 of the housing 12 proximate to the back 18. The handle 20 is configured to be grasped in a hand of a user to position the front 16 of the housing 12 proximate to fecal matter.

A panel 24 is positioned in the top 14 of the housing 12. The panel 24 is hingedly coupled to the housing 12. The panel 24 is configured to hingedly open so that the internal space 26 is accessible to the user. In one embodiment, the panel 24 is hingedly coupled by a first end 28 to the housing 12, proximate to the front 16. The panel 24 extends along the top 14 toward the back 18 of the housing 12 to define a second end 30 of the panel 24. In another embodiment, a latch 32 is coupled to the second end 30 of the panel 24. The latch 32 is configured to reversibly couple to the housing 12 to couple the panel 24 to the housing 12.

An orifice 34 is positioned in the front 16 of the housing 12 and a first grate 36 is positioned in the housing 12 proximate to the back 18 of the housing 12. In one embodiment, the orifice 34 is substantially circularly shaped. In another embodiment, the first grate 36 is substantially ovally shaped. In yet another embodiment, the first grate 36 is positioned in a respective opposing side 38 of the housing 12.

A power module 40 and a motor 42 are coupled to the housing 12 and are positioned in the internal space 26. The motor 42 is selectively operationally couplable to the power module 40. In one embodiment, the power module 40 comprises at least one battery 44. In another embodiment, the at least one battery 44 is rechargeable. In yet another embodiment, the power module 40 is positioned in the handle 20.

A fan 46 is coupled to the motor 42 and is positioned in the internal space 26. The motor 42 is positioned to rotate the fan 46. The fan 46 is configured to pull air and the fecal matter through the orifice 34 into the internal space 26. The fecal matter is retained in the internal space 26 as the air exits the internal space 26 through the first grate 36.

A second grate 48 is coupled to the housing 12 proximate to the fan 46 and defines a chamber 50 that extends from proximate to the fan 46 to the front 16 of the housing 12. The second grate 48 is configured to retain the fecal matter in the chamber 50 as the air passes through the second grate 48 to exit the internal space 26 through the first grate 36.

The device 10 comprises a plurality of liners 52. Each liner 52 is substantially complementary to and positionable in the chamber 50. The liner 52 is configured to separate the fecal matter from the housing 12. The liner 52 that retains the fecal matter is configured to be removed through the top 14 of the housing 12 to sanitarily dispose of the fecal matter. In one embodiment, the liners 52 comprise plastic.

A switch 54 is coupled to the housing 12 proximate to the handle 20. The switch 54 is operationally coupled to the power module 40 and the motor 42. The switch 54 is positioned to selectively couple the power module 40 to the motor 42 to rotate the fan 46. The fan 46 is configured to pull the air and the fecal matter through the orifice 34 into the internal space 26. The fecal matter is retained in the internal space 26 as the air exits the internal space 26 through the first grate 36. In one embodiment, the switch 54 comprises a trigger 56 that is pivotally coupled to and extends from the housing 12.

A bar 58 that has opposing endpoints 60 coupled to the housing 12 is positioned around the trigger 56. The bar 58 is configured so that a finger of the hand grasping the handle 20 can be positioned between the bar 58 and the trigger 56. The trigger 56 is configured to be pulled toward a palm of the hand to selectively couple the power module 40 to the motor 42 to rotate the fan 46. The fan 46 is configured to pull the air and the fecal matter through the orifice 34 into the internal space 26. The fecal matter is retained in the internal space 26 as the air exits the internal space 26 through the first grate 36. The bar 58 also is configured to prevent inadvertent contact with the trigger 56.

The device 10 comprises a strap 62 that has opposing ends 64. Each opposing end 64 is coupled to a respective opposing side 38 of the housing 12 proximate to the back 18. The strap 62 is configured to position over a shoulder of the user to couple the housing 12 to the user.

In one embodiment, each of a pair of first couplers 66 is coupled to a respective opposing end 64 of the strap 62. Each of a pair of second couplers 68 is coupled to a respective opposing side 38 of the housing 12 proximate to the back 18. The second couplers 68 are complementary to the first couplers 66. The second couplers 68 are positioned to couple singly to the first couplers 66 to couple the strap 62 to the housing 12.

In yet another embodiment, each second coupler 68 comprises a slat 70. The slats 70 are arcuate. Each slat 70 has opposing termini 72 that are coupled to the housing 12 so that the slat 70 and the housing 12 define a slot 74. In this embodiment, each first coupler 66 comprises a quick release hook 76. In still yet another embodiment, each of a pair of rings 78 is coupled to and positioned between a respective opposing end 64 of the strap 62 and a respective quick release hook 76.

In use, the strap 62 is configured to position over the shoulder of the user to couple the housing 12 to the user. The handle 20 is configured to be grasped in the hand of the user to position the orifice 34 proximate to the fecal matter. The trigger 56 is positioned to be pulled to selectively couple the power module 40 to the motor 42 to rotate the fan 46. The fan 46 is configured to pull the air and the fecal matter through the orifice 34 into the internal space 26. The second grate 48 is configured to retain the fecal matter in the chamber 50 as the air passes through the second grate 48 to exit the internal space 26 through the first grate 36. The liner 52 that is positioned in the chamber 50 is configured to separate the fecal matter from the housing 12. The liner 52 that retains the fecal matter is configured to be removed through the top 14 of the housing 12 to sanitarily dispose of the fecal matter.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A feces collection device comprising:
   a housing defining an internal space;
   an orifice positioned in a front of said housing;
   a first grate positioned in said housing proximate to a back of said housing;
   a power module coupled to said housing and positioned in said internal space;
   a motor coupled to said housing and positioned in said internal space, said motor being selectively operationally couplable to said power module;
   a fan coupled to said motor and positioned in said internal space;
   a panel positioned in a top of said housing, said panel being hingedly coupled to said housing, wherein said panel is positioned in said housing such that said panel is configured for hingedly opening such that said internal space is accessible to the user;
   a second grate coupled to said housing proximate to said fan defining a chamber extending from proximate to said fan to said front of said housing, wherein said second grate is positioned in said housing such that said second grate is configured for retaining the fecal matter in said chamber as the air passes through said second grate to exit said internal space through said first grate;
   a plurality of liners, each said liner being substantially complementary to and positionable in said chamber, wherein said liner is positioned in said chamber such that said liner is configured for separating the fecal matter from said housing such that said liner retaining the fecal matter is configured for removing through said top of said housing for sanitary disposing of the fecal matter, said liners comprising plastic;

a strap having opposing ends, each said opposing end being coupled to a respective opposing side of said housing proximate to said back, wherein said strap is positioned on said housing such that said strap is configured for positioning over a shoulder of the user for coupling said housing to the user; and wherein said fan is positioned on said motor such that said motor is positioned for rotating said fan such that said fan is configured for pulling air and fecal matter through said orifice into said internal space such that the fecal matter is retained in said internal space as the air exits said internal space through said first grate.

2. The device of claim 1, further including said housing being substantially cylindrically shaped, said housing having a top, said top being arcuate, said top being tapered proximate to said front, said back being convexly arcuate such that said back is rounded.

3. The device of claim 1, further including said housing comprising a handle extending from a bottom of said housing proximate to said back of said housing, wherein said handle is positioned on said housing such that said handle is configured for grasping in a hand of a user for positioning said front proximate to fecal matter.

4. The device of claim 3, further including said power module comprising at least one battery, said at least one battery being rechargeable, said power module being positioned in said handle.

5. The device of claim 3, further including a switch coupled to said housing proximate to said handle, said switch being operationally coupled to said power module and said motor, wherein said switch is positioned on said housing such that said switch is positioned for selectively coupling said power module to said motor for rotating said fan such that said fan is configured for pulling the air and the fecal matter through said orifice into said internal space such that the fecal matter is retained in said internal space as the air exits said internal space through said first grate.

6. The device of claim 5, further including said switch comprising a trigger pivotally coupled to and extending from said housing.

7. The device of claim 6, further including a bar having opposing endpoints coupled to said housing such that said bar is positioned around said trigger, wherein said bar is positioned on said housing such that said bar is configured for positioning of a finger of a hand grasping said handle between said bar and said trigger such that said trigger is configured for pulling toward a palm of the hand for selectively coupling said power module to said motor for rotating said fan such that said fan is configured for pulling the air and the fecal matter through said orifice into said internal space such that the fecal matter is retained in said internal space as the air exits said internal space through said first grate, and wherein said bar is positioned on said housing such that said bar is configured for preventing inadvertent contact with said trigger.

8. The device of claim 1, further including said panel being hingedly coupled by a first end to said housing proximate to said front and extending along said top toward said back of said housing defining a second end of said panel.

9. The device of claim 8, further including a latch coupled to said second end of said panel, said latch being configured for reversibly coupling to said housing for coupling said panel to said housing.

10. The device of claim 1, further including said orifice being substantially circularly shaped, said first grate being substantially ovally shaped, said first grate being positioned in a respective said opposing side of said housing.

11. The device of claim 1, further comprising:
a pair of first couplers, each said first coupler being coupled to a respective said opposing end of said strap;
a pair of second couplers, each said second coupler being coupled to a respective said opposing side of said housing proximate to said back, said second couplers being complementary to said first couplers; and
wherein said second couplers are positioned on said strap such that said second couplers are positioned for coupling singly to said first couplers for coupling said strap to said housing.

12. The device of claim 11, further including each said second coupler comprising a slat, said slats being arcuate, each said slat having opposing termini coupled to said housing such that said slat and said housing define a slot, each said first coupler comprising a quick release hook.

13. The device of claim 12, further including a pair of rings, each said ring being coupled to and positioned between a respective said opposing end of said strap and a respective said quick release hook.

14. A feces collection device comprising:
a housing defining an internal space, said housing being substantially cylindrically shaped, said housing having a top, a bottom, a front, a back and opposing sides, said back being convexly arcuate such that said back is rounded, said top being arcuate, said top being tapered proximate to said front, said housing comprising a handle extending from said bottom proximate to said back, wherein said handle is positioned on said housing such that said handle is configured for grasping in a hand of a user for positioning said front proximate to fecal matter;
a panel positioned in said top of said housing, said panel being hingedly coupled to said housing, wherein said panel is positioned in said housing such that said panel is configured for hingedly opening such that said internal space is accessible to the user, said panel being hingedly coupled by a first end to said housing proximate to said front and extending along said top toward said back of said housing defining a second end of said panel;
a latch coupled to said second end of said panel, said latch being configured for reversibly coupling to said housing for coupling said panel to said housing;
an orifice positioned in a front of said housing, said orifice being substantially circularly shaped;
a first grate positioned in said housing proximate to said back of said housing, said first grate being substantially ovally shaped, said first grate being positioned in a respective said opposing side of said housing;
a power module coupled to said housing and positioned in said internal space, said power module comprising at least one battery, said at least one battery being rechargeable, said power module being positioned in said handle;
a motor coupled to said housing and positioned in said internal space, said motor being selectively operationally couplable to said power module
a fan coupled to said motor and positioned in said internal space, wherein said fan is positioned on motor such that said motor is positioned for rotating said fan such that said fan is configured for pulling air and fecal matter through said orifice into said internal space such that the fecal matter is retained in said internal space as the air exits said internal space through said first grate;

a second grate coupled to said housing proximate to said fan defining a chamber extending from proximate to said fan to said front of said housing, wherein said second grate is positioned in said housing such that said second grate is configured for retaining the fecal matter in said chamber as the air passes through said second grate to exit said internal space through said first grate;

a plurality of liners, each said liner being substantially complementary to and positionable in said chamber, wherein said liner is positioned in said chamber such that said liner is configured for separating the fecal matter from said housing such that said liner retaining the fecal matter is configured for removing through said top of said housing for sanitary disposing of the fecal matter, said liners comprising plastic;

a switch coupled to said housing proximate to said handle, said switch being operationally coupled to said power module and said motor, wherein said switch is positioned on said housing such that said switch is positioned for selectively coupling said power module to said motor for rotating said fan such that said fan is configured for pulling the air and the fecal matter through said orifice into said internal space such that the fecal matter is retained in said internal space as the air exits said internal space through said first grate, said switch comprising a trigger pivotally coupled to and extending from said housing;

a bar having opposing endpoints coupled to said housing such that said bar is positioned around said trigger, wherein said bar is positioned on said housing such that said bar is configured for positioning of a finger of a hand grasping said handle between said bar and said trigger such that said trigger is configured for pulling toward a palm of the hand for selectively coupling said power module to said motor for rotating said fan such that said fan is configured for pulling the air and the fecal matter through said orifice into said internal space such that the fecal matter is retained in said internal space as the air exits said internal space through said first grate, and wherein said bar is positioned on said housing such that said bar is configured for preventing inadvertent contact with said trigger;

a strap having opposing ends, each said opposing end being coupled to a respective said opposing side of said housing proximate to said back, wherein said strap is positioned on said housing such that said strap is configured for positioning over a shoulder of the user for coupling said housing to the user;

a pair of first couplers, each said first coupler being coupled to a respective said opposing end of said strap;

a pair of second couplers, each said second coupler being coupled to a respective said opposing side of said housing proximate to said back, said second couplers being complementary to said first couplers, wherein said second couplers are positioned on said strap such that said second couplers are positioned for coupling singly to said first couplers for coupling said strap to said housing, each said second coupler comprising a slat, said slats being arcuate, each said slat having opposing termini coupled to said housing such that said slat and said housing define a slot, each said first coupler comprising a quick release hook;

a pair of rings, each said ring being coupled to and positioned between a respective said opposing end of said strap and a respective said quick release hook; and wherein said strap is positioned on said housing such that said strap is configured for positioning over the shoulder of the user for coupling said housing to the user, wherein said handle is positioned on said housing such that said handle is configured for grasping in the hand of the user for positioning said front proximate to the fecal matter, wherein said trigger is positioned on said housing such that said trigger is positioned for selectively coupling said power module to said motor for rotating said fan such that said fan is configured for pulling the air and the fecal matter through said orifice into said internal space, wherein said second grate is positioned in said housing such that said second grate is configured for retaining the fecal matter in said chamber as the air passes through said second grate to exit said internal space through said first grate, wherein said liner is positioned in said chamber such that said liner is configured for separating the fecal matter from said housing such that said liner retaining the fecal matter is configured for removing through said top of said housing for sanitary disposing of the fecal matter.

\* \* \* \* \*